United States Patent [19]
Oda et al.

[11] Patent Number: 4,588,794
[45] Date of Patent: May 13, 1986

[54] PROCESS FOR PRODUCTION OF RUBBERY ETHYLENE/1-BUTENE/POLYENE COPOLYMERS

[75] Inventors: Hidekuni Oda, Iwakuni; Kazuhiko Murata; Hirokazu Kajiura, both of Ohtake; Akira Matsuda, Ichihara, all of Japan

[73] Assignee: Mitsui Petrochemical Industries, Ltd., Japan

[21] Appl. No.: 644,670

[22] Filed: Aug. 28, 1984

Related U.S. Application Data

[60] Continuation of Ser. No. 444,061, Nov. 23, 1982, abandoned, which is a continuation of Ser. No. 232,389, Feb. 7, 1981, abandoned, which is a division of Ser. No. 49,207, Jun. 15, 1979, abandoned.

[30] Foreign Application Priority Data

Apr. 13, 1979 [JP] Japan ................... 54-44274
Apr. 13, 1979 [JP] Japan ................... 54-44275
Apr. 13, 1979 [JP] Japan ................... 54-44276

[51] Int. Cl.$^4$ ................................ C08F 4/68
[52] U.S. Cl. ................ 526/169.2; 525/332.1; 526/282; 526/283
[58] Field of Search ........................ 526/169.2

[56] References Cited

U.S. PATENT DOCUMENTS

| 3,291,780 | 12/1961 | Gladding | 526/282 |
|---|---|---|---|
| 3,489,733 | 1/1970 | Natta | 526/282 |
| 3,567,653 | 3/1971 | Wagensommer | 526/282 |
| 3,574,176 | 4/1971 | Boozer | 526/282 |
| 3,645,992 | 2/1972 | Elston | 526/282 |
| 3,674,755 | 7/1972 | Yamamoto | 526/282 |
| 3,725,364 | 4/1973 | Wagensommer | 526/282 |
| 3,894,999 | 7/1975 | Boozer | 526/282 |
| 3,896,096 | 7/1975 | Visser | 526/282 |
| 3,937,763 | 2/1976 | Ogura | 526/282 |
| 3,969,331 | 7/1976 | Fauser | 526/66 |
| 3,980,623 | 9/1976 | Staib | 526/282 |
| 4,125,699 | 11/1978 | Yamamoto | 526/282 |
| 4,156,767 | 5/1979 | Hall | 526/282 |
| 4,168,358 | 9/1979 | Harada | 526/137 |

FOREIGN PATENT DOCUMENTS

| 2722968 | 12/1977 | Fed. Rep. of Germany | 526/169.2 |
|---|---|---|---|
| 682924 | 4/1964 | Japan | 526/282 |
| 43-2924 | 2/1968 | Japan | |
| 49-14542 | 4/1974 | Japan | 526/282 |
| 856737 | 12/1960 | United Kingdom | 526/282 |
| 1014874 | 12/1965 | United Kingdom | 526/282 |
| 1112067 | 5/1968 | United Kingdom | 526/282 |
| 1142335 | 2/1969 | United Kingdom | 526/282 |
| 1159554 | 7/1969 | United Kingdom | 526/169.2 |

Primary Examiner—Christopher A. Henderson
Attorney, Agent, or Firm—Sherman and Shalloway

[57] ABSTRACT

A rubbery copolymer of ethylene, 1-butene and a polyene, characterized by having (A) an ethylene/1-butene mole ratio of from 86/14 to 95/5, (B) an iodine value of from 2 to 40, (C) an intrinsic viscosity [η], measured in decalin at 135° C., of from 0.8 to 4 dl/g, and (D) a weight average molecular weight/number average molecular weight ratio ($\overline{M}w/\overline{M}n$) of less than 3; and a process for the production thereof.

8 Claims, No Drawings

PROCESS FOR PRODUCTION OF RUBBERY ETHYLENE/1-BUTENE/POLYENE COPOLYMERS

This application is a continuation of application Ser. No. 444,061, filed Nov. 23, 1982 and now abandoned, which in turn is a continuation of application Ser. No. 232,389, filed Feb. 7, 1981, now abandoned, which in turn is a division of application Ser. No. 49,207, filed June 15, 1979, also now abandoned.

BACKGROUND OF THE INVENTION

This invention relates to rubbery copolymers of ethylene, 1-butene and polyenes having specified characteristics and superior improved properties, and to a process for production thereof.

Specifically, this invention relates to ethylene-rich rubbery copolymers which are sulfur-curable and pelletizable without forming agglomerated masses, and which exhibit superior strength characteristics, especially high tensile strength at break, as well as a fast rate of vulcanization, superior moldability, improved surface characteristics, etc., and to a process for production thereof.

More specifically, this invention relates to a rubbery copolymer of ethylene, 1-butene and a polyene, characterized by having (A) an ethylene/1-butene mole ratio of from 86/14 to 95/5, (B) an iodine value of from 2 to 40, (C) an intrinsic viscosity $[\eta]$, measured in decalin at 135° C., of from 0.8 to 4 dl/g, and (D) a weight average molecoular weight/number average molecular weight ratio ($\overline{M}w/\overline{M}n$) of less than 3.

Many suggestions have been made in the past about the production of rubbers of the olefinic copolymer type such as an ethylene/propylene type or an ethylene/1-butene type. It has been difficult however to provide rubbers of the olefinic copolymer type which are sulfur-curable and pelletizable without forming agglomerated masses, and which exhibit superior strength characteristics as well as other satisfactory properties such as a high rate of vulcanization, good moldability and good surface characteristics.

British Pat. No 856,737 discloses a rubbery ethylene/1-butene copolymer which is obtained by using a catalyst composed of a titanium or vanadium compound, preferably titanium or vanadium tetrachloride and vanadium oxychloride, and an aluminum alkyl compound excluding aluminum monoalkyl dihalides, such as an aluminum trialkyl or aluminum dialkyl halide, particularly trihexyl aluminum or triisobutyl aluminum. However, the British Patent is quite silent on the use of a polyene which is one essential ingredient of the rubbery copolymer of the present invention. The copolymer obtained by the British Patent is not sulfur-curable and has poor strength characteristics. This copolymer is difficult to pelletize because of too broad distributions of its composition and molecular weight, or the resulting pellets tend to be agglomerated. Furthermore, the vanadium component and the organoaluminum component of the catalyst used in the British Patent do not come within the vanadium and organoaluminum components of the catalyst specified in the present application.

U.S. Pat. No. 3,645,992 (corresponding to Japanese Patent Publication No. 21212/71 discloses a process for continuously producing a homogeneous random partially crystalline copolymer of ethylene and a α-olefin such as 1-butene, 1-hexene or 1-octene having a narrow molecular weight distribution using a catalyst which may overlay the catalyst used in the present invention. The U.S. Patent, however, does not at all describe the use of polyenes. Hence, the resulting copolymer is not sulfur-curable. To obtain a copolymer having good uniformity, it is necessary to reduce the concentration of the catalyst, and to decrease the yield of the copolymer per unit amount of solvent.

British Pat. No. 1,014,874 (corresponding to Japanese Patent Publication No. 16148/65) discloses a process for producing a sulfur-curable copolymer rubber of ethylene, an α-olefin such as propylene or 1-butene and dicyclopentadiene and/or methylcyclopentadiene dimer using a catalyst comprising an alkyl aluminum halide and a vanadium compound selected from the group consisting of $VCl_4$ and $VOCl_3$. The vanadium compounds as an essential catalyst ingredient in this British Patent do not come within the vanadium compounds specified in the present invention. As will be shown later by a comparative working example, the objects of this invention cannot be achieved by the use of the vanadium compounds disclosed in the British Patent.

Japanese Patent Publication No. 14542/74 discloses a process for producing an ethylene/α-olefin copolymer using a catalyst system prepared by bubbling an inert gas into the reaction mixture of an alcohol and vanadium oxytrichloride in an inert solvent, and mixing the product with an alkyl aluminum compound. This Japanese Patent Publication states that the aforesaid catalyst system should be used because the use of a vanadium compound having an alkoxy group such as $VO(OR_3)$, $VO(OR)_2$ and $VO(OR)X_2$ in which R represents an alkyl group and X represents a halogen atom is very expensive. The Japanese Patent Publication also teaches the use of trialkyl aluminums, dialkyl aluminum monohalides, monoalkyl aluminum dihalides and alkyl aluminum sesquihalides, preferably dialkyl aluminum monohalides and alkylaluminum sesquihalides, as the alkyl aluminum compounds. The Japanese Patent Publication exemplifies propylene and 1-butene as the α-olefin and indicates the use of a polyene as an optional comonomer component. The Japanese Patent Publication specifically discloses only a rubbery copolymer of ethylene, propylene and dicyclopentadiene, and gives a specific example only of the copolymer having an ethylene content of 48 to 53% by weight. This copolymer does not have satisfactory pelletizability, and even when it is forcibly pelletized, the resulting pellets will be rapidly aglomerated and lose the shape of pellet. Of course, such a copolymer cannot have the improved properties of the copolymer of this invention which are described hereinabove.

Japanese Patent Publication No. 2924/68 discloses a process for the production of a similar copolymer to the above cited Japanese Patent Publication No. 14542/74 using a catalyst comprising the reaction mixture of an alcohol and vanadium oxytrichloride and a dialkylaluminum monohalide or alkylaluminum sesquihalide. This Japanese Patent Publication specifically shows only a rubbery ethylene/propylene copolymer, and the copolymers obtained in all of the specific working examples in this Publication have an ethylene content of 32 to 58% by weight. Such copolymers do not show satisfactory pelletizability, nor the improved properties of the rubbery copolymers of this invention.

U.S. Pat. No. 3,674,755 (corresponding to Japanese Patent Publication No. 47591/72) discloses a method for preparing an olefinic hydrocarbon copolymer which comprises contacting ethylene and an α-olefin having 3 to 20 carbon atoms, with or without a polyene compound, with (A) a vanadium compound having the general formula $VO(OR)_mX_{3-m}$, in which R is a radical containing cycloaliphatic hydrocarbon having 5 to 20 carbon atoms, X is a halogen atom and m is an integer from 1 to 3 and (B) organoaluminum compound having the general formula $AlR_n'X_{3-n}'$ in which R' is a hydrocarbon radical having 1 to 20 carbon atoms, X' is a halogen atom and n is an integer of from 1 to 3, the concentration of (A) in the reaction medium being from $10^{-4}$ millimole per liter to 50 millimole per liter, and the molar ratio of (B) to (A) being from 1;1 to 10,000:1. All of the Examples in this U.S. Patent disclose only an ethylene/propylene rubber with an ethylene content of from 49.3 to 78.5% by mole. Such a copolymer does not have satisfactory pelletizability, nor the improved properties of the rubbery copolymer of this invention.

SUMMARY OF THE INVENTION

The present inventors made investigations about a rubber of the olefinic copolymer type which is sulfur-curable and pelletizable without forming agglomerated masses, and which exhibits superior strength characteristics as well as satisfactory rates of vulcanization, moldability, surface characteristics, etc. These investigations led to the discovery that a rubbery copolymer of ethylene, 1-butene and a polyene exists which has a higher ethylene content than conventional ethylene/propylene polyene copolymers as shown by its ethylene/1 butene mole ratio of from 86/16 to 95/5, an iodine value, attributed to the polyene, of from 2 to 40, an intrinsic viscosity [η], measured in decalin at 135° C., of from 0.8 to 4 dl/g, and a weight average molecular weight/number average molecular weight ratio ($\overline{Mw}/\overline{Mn}$) of less than 3, and which has the superior properties described hereinabove.

It has also been found that this copolymer having the specified characteristics can be easily produced by copolymerization under specified copolymerication conditions in combination with a selected specified catalyst.

It is an object of this invention therefore to provide a rubbery copolymer of ethylene, 1-butene and a polyene having these specified characteristics and improved properties, and a process for production thereof.

The above and other objects of this invention along with its advantages will become more apparent from the following description.

DETAILED DESCRIPTION OF THE INVENTION

The rubbery ethylene/1-butene/polyene copolymer of this invention has the following characteristics (A) to (D).

(A) It has an ethylene/1-butene mole ratio of from 86/14 to 95/5, preferably from 87/13 to 94/6.

(B) It has an iodine value of from 2 to 40, preferably from 4 to 30.

(C) It has an intrinsic viscosity [η], measured in decalin at 135° C. in accordance with ASTM D-1601-78, D-2857-70, of from 0.8 to 4 dl/g, preferably from 0.8 to 3 dl/g.

(D) It has an $\overline{Mw}/\overline{Mn}$ ratio of less than 3, preferably from 2 to 2.9.

When at least one compound selected from dicyclopentadiene and 5-vinyl-2-norbornene is used as the polyene, the resulting rubbery copolymer of this invention has the following characteristic (E) in addition to (A) to (D) above.

(E) The ratio of the intrinsic viscosity [η] of the rubbery copolymer to the intrinsic viscosity of a linear ethylene/1-butene random copolymer having an ethylene content of 90 mole % and the same weight average molecular weight (determined by a light scattering method) as the rubbery copolymer of the invention $(g_\eta^* = [\eta]/[\eta]_l)$ is from 0.2 to 0.9, preferably from 0.3 to 0.8.

In the present application, the $\overline{Mw}/\overline{Mn}$ ratio (D) (to be sometimes referred to herein as a Q value), and $g^*_\eta$ (E) are determined by the following methods.

Q value ($\overline{Mw}/\overline{Mn}$)

The Q value is determined in the following manner in accordance with the procedure described at pages 14 to 114 of "Gel Permeation chromatography" by Takeuchi, published on May 20, 1976 by Maruzen Co., Ltd., Tokyo.

(1) Using standard polystyrene of a known molecular weight (mono-dispersed polystyrene, a product of Toyo Soda Mfg. Co., Ltd., Japan), the molecular weight M of the copolymer sample and its GPC (gel permeation chromatography) count are measured. A calibration curve for the molecular weight M and the EV (elution volume) is drawn. The concentration of the polymer at this time is set at 0.02% by weight.

(2) A gel permeation chromatogram of the sample is taken by the GPC measuring method, and the number average molecular weight $$Mn = \frac{\Sigma M_i N_i}{\Sigma N_i}$$

and the weight average molecular weight $$Mw = \frac{\Sigma M_i^2 N_i}{\Sigma M_i N_i}$$

are calculated for polystyrene by (1) above, and the Q value ($\overline{Mw}/\overline{Mn}$) is determined.

The sample is prepared under the following conditions, and the conditions for GPC are as shown below.

PREPARATION OF THE SAMPLE (a) The sample is taken into an Erlenmeyer flask together with o-dichlorobenzene so as to provide a 0.04% solution.

(b) Into the Erlenmeyer flask containing the sample is added 0.1% by weight, based on the polymer solution, of 2,6-di-tert.-butyl-p-cresol as an anti-oxidant.

(c) The Erlenmeyer is heated to 140° C., and the contents are stirred for about 30 minutes to dissolve the polymer and the antioxidant.

(d) Then, at 135° to 140° C., the solution is filtered by a 1 Mill:Pore filter.

(e) The filtrate is subjected to gel permeation chromatography.

CONDITIONS FOR GEL PERMEATION CHROMATOGRAPHY (a) Device: Model 200, made by Waters Company
(b) Column: S-type (mix type) made by Toyo Soda Mfg. Co., Ltd.
(c) Amount of the sample: 2 ml
(d) Temperature: 135° C.
(e) Flow rate: 1 ml/min.
(f) Total theoretical stages of the column: $2 \times 10^4$ to $4 \times 10^4$ (measured with acetone) $g^*_\eta$ (1) The weight average molecular weights $\overline{M}w$ and intrinsic viscosities $[\eta]_l$ of various linear ethylene/1-butene random copolymers (with an ethylene content of 90 mole %) having different molecular weights are measured, and the relation between $\overline{M}w$ and $[\eta]_l$ is determined.

$$[\eta]_l = 7.60 \times 10^{-4} \overline{M}w^{0.664}$$

The $\overline{M}w$ is measured by the light scattering method, and $[\eta]_l$ is measured by the above method.

The linear ethylene/1-butene random copolymers are obtained by copolymerizing ethylene with 1-butene in hexane using $VOCl_3$ and ethylaluminum sesquichloride.

(2) Then, the $\overline{M}w$ and $[\eta]$ of the rubbery copolymer of this invention are measured.

(3) $g^*_\eta$ of the rubbery copolymer to the intrinsic viscosity $[\eta]$ of the rubbery copolymer to the intrinsic viscosity $[\eta]_l$ of a linear ethylene/1-butene random copolymer having the same weight average molecular weight as the rubbery copolymer of the invention. Namely, $$g^*_\eta = [\eta]/[\eta]_l$$

The light scattering method for measuring $\overline{M}w$ substantially follows Lois J. Frolen et al., Journal of Research of NBS (National Beureau of Standard), Part A, vol. 76A, No. 2, pages 156–160 (1972).

Typical examples of the polyene used to prepare the rubbery ethylene/1-butene/polyene copolymer of this invention include non-conjugated dienes such as 1,4-hexadiene, 1,6-octadiene, 2-methyl-1,5-hexadiene, 6-methyl-1,5-heptadiene, 7-methyl-1,6-octadiene, cyclohexadiene, dicyclopentadiene, methyltetrahydroindene, 5 vinyl-2-norbornene, 5-ethylidene-2-norbornene, 5 methylene-2-norbornene, 5-isopropylidene-2-norbornene, 6-chloromethyl-5-isopropenyl-2-norbornene, divinylbenzene, 1,5-hexadiene and norbornadiene; and trienes such as 2,3-diisopropylidene-5-norbornene, 2-ethylidene-3-isopropylidene-5-norbornene, 2-propenyl-2,5-norbornadiene, 1,3,7-octatriene and 1,4,9-decatriene. Particularly interesting polyenes are dicyclopentadiene, 5-vinyl-2-norbornene and 5-ethylidene-2-norbornene. Copolymers obtained by using dicyclopentadiene or 5-vinyl-2-norbornene as the polyene component have good processability (in regard to the surface texture of the extrudate or the rate of extrusion) and superior strength characteristics and elastic properties. Copolymers obtained by using 5-ethylidene-2-norbornene as the polyene component have a fast rate of vulcanization and superior vulcanizate strength and heat aging resistance.

According to a preferred embodiment of this invention, therefore, there is provided a rubbery ethylene/1-butene/polyene copolymer in which the polyene is at least one member selected from the group consisting of dicyclopentadiene, 5-vinyl-2-norbornene and 5-ethylidene-2-norbornene.

When propylene is used instead of 1-butene in preparing a rubbery copolymer of this invention, the resulting copolymer is hard and has poor elastic properties and strength characteristics.

The ethylene/1-butene mole ratio required of the rubbery copolymers of this invention [characteristic (A)] is ethylene-rich as compared with the ethylene/α-olefin mole ratio required and conventionally used to prepare rubbery copolymers of ethylene, propylene and polyenes. When the ethylene content of the copolymer of this invention is lower than the limit of the specified ethylene/1-butene mole ratio, the strength characteristics of the copolymer are degraded, and when it is higher than the specified limit the elastic properties of the copolymer are degraded. Hence, the ethylene/1-butene mole ratio of the copolymer of this invention is set at from 86/14 to 95/5, preferably from 87/13 to 94/6.

The characteristic (B) required of the rubbery copolymer of the invention has to do with the content of the polyene component that constitutes the rubbery copolymer. When the copolymer has an iodine value within the specified range, the rate of vulcanization is high, and the resulting vulcanized rubber has good properties. When the iodine value of the copolymer is lower than the specified limit, the copolymer is not sulfur-curable, or the rate of its vulcanization becomes extremely small. If it exceeds the specified upper limit, the strength characteristics of the vulcanizate are poor. Acoordingly, the iodine value of the rubbery copolymer of this invention should be from 2 to 40, preferably from 4 to 30. This corresponds to the presence of about 1 to 20% by weight, preferably about 2 to 15% by weight, of the polyene component in the rubbery copolymer.

The characteristic (C) required of the rubbery copolymer of this invention affects the processability and strength characteristics of the copolymer. Excellent processability and strength characteristics are imparted when the copolymer has the specified intrinsic viscosity $[\eta]$ (measured in decalin at 135° C.). If the intrinsic viscosity is too low, the strength characteristics of the vulcanized copolymer are poor. If it is too high, the vulcanization characteristics, such as roll processability and extrudability, of the copolymer are degraded. Accordingly, the copolymer of this invention should have an $[\eta]$ of from 0.8 to 4 dl/g, preferably from 0.8 to 3 dl/g.

The characteristic (D) required of the rubbery copolymer of this invention affects the strength characteristics of the rubbery copolymer. When the Q value is more than 3, the uncured rubbery copolymer and the vulcanized rubber both have poor strength, and the surface of the molded product tends to become sticky. Accordingly, the copolymer of this invention should have a Q value ($\overline{M}w/\overline{M}n$) of less than 3, preferably from 2 to 2.9. When 5-ethylidene-2-norbornene is selected as the polyene, the Q value of the copolymer is preferably from 2 to 2.5. When cyclopentadiene or 5-viny-2-norbornene is selected as the polyene, the copolymer preferably has a Q value of from 2.5 to 2.9.

The rubbery copolymer of this invention is required to have a combination of these characteristics (A) to (D). As a result of these characteristics affecting one another, the rubbery copolymer of this invention has satisfactory properties desired in rubber in a well balanced combination.

In addition to these characteristics (A) to (D), the rubbery copolymer of this invention usually has a JIS A hardness of about 50 to 85.

Usually, the rubbery copolymer of this invention has a tensile strength at break of at least 30 kg/cm² and an elongation at break of about 200 to 2,000%, as measured in accordance with JIS K6301. When 5 ethylidene-2-norbornene is selected as the polyene, the copolymer, usually has a tensile strength at break of at least 50 kg/cm².

When dicyclopentadiene or 5-vinyl-2-norbornene is selected as the polyene, the copolymer of this invention preferably has characteristic (E) in addition to the characteristics (A) to (D) Characteristic (E) means that the rubbery copolymer of this invention has a much higher weight average molecular weight ($\overline{M}w$) determined by the light scattering method) than other ethylene copolymers having the same intrinsic viscosity as the copolymer of the invention. The rubbery copolymer has a $g^*_\eta$ (as defined hereinabove) of from 0.2 to 0.9, preferably from 0.3 to 0.8. The fact that $g^*_\eta$ considerably smaller than 1 suggests the presence of long-chain branching or crosslinked structure in addition to short chain branching attributed to 1-butene as a comonomer to be polymerized with ethylene, and shows a difference from ethylene copolymers prepared by conventional methods which contain only short-chain branching. However, because the copolymer of this invention is soluble in boiling hexane, it is not a highly crosslinked product. Since $G^*_\eta$ is considerably smaller than 1, the copolymer of this invention has good processability (extrudability to be described hereinbelow; I value) despite its small Q value. Copolymers having a $g^*_\eta$ of more than 0.9 have poor processability.

The rubbery ethylene/1 butene/polyene copolymer of this invention can be obtained by copolymerizing ethylene, 1-butene and a polyene in an inert hydrocarbon medium at a temperature of from about 40° C. to about 100° C. in the presence of a catalyst composed of (a) vanadium compounds expressed by the formula $$VO(OR)_nX_{3-n}$$

wherein R represents a hydrocarbon group, X represents a halogen atom, and n is a positive number within the range of $0<n\leq 3$, and (b) organoaluminum compounds of the formula $$R_m'AlX_{3-m}'$$

wherein R' represents a hydrocarbon group, X' represents a halogen atom, and m is a positive number within the range of $1<m<1.5$, the Al/V mole ratio in the catalyst being at least 5.

In the formula representing the vanadium compounds (a), examples of R include aliphatic hydrocarbon groups such as methyl, ethyl, propyl, butyl, heptyl, hexyl and octyl; alicyclic hydrocarbon groups suoh as cyclohexyl; and aromatic hydrocarbon groups such as phenyl or benzyl. Of these, the aliphatic hydrocarbon groups are preferred, and alkyl groups having 1 to 20 carbon atoms, preferably 1 to 3 carbon atoms, are suitable. Preferred halogen atoms for X are chlorine and bromine. Preferably, n is a positive number within the range of $1\leq n\leq 1.5$.

When instead of the vanadium compounds (a), vanadium oxyhalides ($VOX_3$) or vanadium tetrahalides ($VX_4$) are used, the yield of the copolymer becomes low, and a gel forms during polymerization. Furthermore, the strength characteristics and transparency of the copolymer will be deteriorated.

Specific examples of the vanadium compounds (a) include $VO(OCH_3)Cl_2$, $VO(OCH_3)_2Cl$, $VO(OCH_3)_3$, $VO(OC_2H_5)Cl_2$, $VO(OC_2H_5)_{1.5}Cl_{1.5}$, $VO(OC_2H_5)_2Cl$, $VO(OC_2H_5)_3$, $VO(OC_2H_5)_{1.5}Br_{1.5}$, $VO(OC_3H_7)Cl_2$, $VO(OC_3H_7)_{1.5}Cl_{1.5}$, $VO(OC_3H_7)_2Cl$, $VO(OC_3H_7)_3$, $VO(O\text{ n-}C_4H_9)Cl_2$, $VO(O\text{ n-}C_4H_9)_2Cl$, $VO(O\text{ iso-}C_4H_9)_2Cl$, $VO(O\text{ sec-}C_4H_9)_3$, $VO(OC_5H_{11})_{1.5}Cl_{1.5}$, and mixtures of these. These compounds can be easily obtained, for example, by reacting $VOCl_3$ with alcohols, or by reacting $VOCl_3$ with $VO(OR)_3$.

Selection of the organoaluminum compound is important in this invention. In the formula representing the organoaluminum compound (b), m should be within the range of $1<m<1.5$, preferably $1.2\leq m\leq 1.4$. If m is 1.5, the organoaluminum compound is, for example, an alkyl aluminum sesquihalide typified by ethyl aluminum sesquichloride. If it is used instead of the organoaluminum compound (b) used in this invention, the rate of polymerization will decrease, and a gel tends to form during polymerization. Moreover, the strength characteristics and transparency of the copolymer will be degraded. If m is 1, the organoaluminum compound is, for example, an alkyl aluminum dihalide typified by ethyl aluminum dichloride. If it is used instead of the organoaluminum compound (b) used in this invention, the activity of the catalyst will be low, and a rubbery copolymer having good strength characteristics and transparency cannot be obtained.

Examples of R' and X' in the formula representing the organoaluminum compound (b) are those of R and X respectively given with regard to the vanadium compounds (a).

The organoaluminum compound (b) used in this invention can be prepared, for example, by mixing $R'AlX_2'$ and $R_{1.5}'AlX_{1.5}'$ and/or $R_2'AlX'$ such that the average composition of the mixture will be the one expressed by the above formula. Of course, m R's need not to be the same. Specific examples are a mixture in an arbitrary ratio of $C_2H_5AlCl_2$ and $(C_2H_5)_{1.5}AlCl_{1.5}$, a mixture in an arbitrary ratio of iso-$C_4H_9AlCl_2$ and (iso-$C_4H_9)_{1.5}$, and a mixture in an arbitrary ratio of $C_2H_5AlCl_2$ and (iso-$C_4H_9)_{1.5}$-$AlCl_{1.5}$.

The ratio between the organoaluminum compound (b) and the vanadium compound (a) is also important in this invention. Thus, the Al/V mole ratio should be at least 5, preferably not more than 30, especially preferably from 7 to 20. When the Al/V mole ratio is lower than the specified limit, a gel tends to form during polymerization, and a rubbery copolymer having good strength characteristics and transparency cannot be obtained. When this ratio is too high, the rate of polymerization tends to decrease, and the cost of production increases.

Superior results can be obtained in this invention when the copolymerization is carried out at a temperature of 40° to 100° C., preferably 50° to 80° C.

In the process of this invention, the copolymerization is carried out in an inert hydrocarbon medium. Examples of the inert hydrocarbon medium are aliphatic hydrocarbons such as hexane, heptane, octane and kerosene; alicyclio hydrooarbons such as cyolohexane, and aromatic hydrocarbons such as benzene, toluene and xylene. These hydrocarbons can be used either alone or in combination. Or 1-butene may be used in excess to make them serve also as the reaction medium.

Preferably, the copolymerization is carried out such that the concentration of the vanadium compound (a) is from 0.01 to 5 millimoles/liter, preferably from 0.1 to 2 millimoles/liter. The amount of the organoaluminum compound (b) is adjusted such that the Al/V mole ratio becomes at least 5, preferably not more than 30, especially preferably from 7 to 20. The polymerization temperature is 40° to 100° C., preferably 50° to 80° C. The polymerization pressure is generally from atmospheric pressure to 50 kg/cm$^2$.G, preferably from atmospheric pressure to 20 kg/cm$^2$.G.

The copolymerization can be carried out either batchwise or continuously, but preferably, it is performed continuously. The average residence time in the polymerization vessel is preferably from about 5 to about 300 minutes, particularly from about 10 minutes to about 250 minutes. The copolymerization is carried out preferably under such conditions that the rubbery copolymer dissolves in the reaction medium. A molecular weight controlling agent such as hydrogen may be added when it is desired to control the molecular weight of the rubbery copolymer. The ethylene content and molecular weight of the rubbery copolymer can be controlled by varying the ratio between ethylene and 1-butene and the concentration of hydrogen used for molecular weight control.

The rubbery ethylene/1-butene/polyene copolymer of this invention is sulfur-curable, and can be cured in the same way as rubbery copolymers of ethylene, propylene and polyenes.

Suitable vulcanizing agents for rubber compounding recipes include peroxides, sulfur, sulfur compounds such as sulfur monochloride, sulfur dichloride, morpholine disulfide, alkyl phenol disulfides, tetramethylthiuram disulfide, and selenium dimethyldithiocarbamate, and metallic compounds such as magnesium oxide, zinc oxide and red lead. Sulfur and the peroxides are especially preferred. When vulcanization is carried out using sulphur, its amount is adjusted to about 0.1 to about 10 parts by weight, preferably from about 0.5 to about 5 parts by weight, per 100 parts by weight of the rubbery component.

As required, a vulcanization accelerator may be used in vulcanization. Examples of the vulcanization accelerators include thiazole compounds suoh as N cyclohexyl-2-benzothiazole sulfenamiden, N-oxydiethylene-2-benzothiazolesulfenamide, N,N-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole and benzothiazyldisulfide; guanidine compounds such as diphenyl guanidine, triphenyl guanidine, di-ortho-tolyl guanidine, ortho-tolyl biguanide and diphenyl guanidine phthalate; aldehyde-amine compounds such as the reaction product of butyraldehyde and aniline; aldehyde-ammonia compounds such as hexamethylene diamine and acetaldehyde-ammonia; imidazoline compounds such as 2-mercaptoimidazoline; thiourea compounds such as thiocarbanilide, diethylthiourea, dibutylthiourea, trimethylthiourea and di-ortho-tolyl thiourea; thiuram compounds such as tetramethylthiuram monosulfide, tetramethylthiuram disulfide, tetraethylthiuram disulfide, tetrabutylthiuram disulfide and dipentamethylenethiuram tetrasulfide; dithiocarbamate compounds such as zinc dimethyldithiocarbamate, zinc diethylthiocarbamate, zinc di-n-butyldithiocarbamate, zinc ethylphenyldithiocarbamate, zinc butylphenyldithiocarbamate, sodium dimethyldithiocarbamate, selenium dimethyldithiooarbamate and tellurium diethyldithiocarbamate; and xanthates such as zinc dibutylxanthogenate. The vulcanization accelerator is used in an amount of usually about 0.1 to about 20 parts by weight, preferably about 0.2 to about 10 parts by weight, per 100 parts by weight of the rubbery component.

The rubbery ethylene/1-butene/polyene copolymer of this invention can also be vulcanized with peroxide vulcanization systems. Suitable peroxides that can be used for this purpose are dicumyl peroxide, 1,1'-di-(t-butyl-peroxy)-3,3,5 primethylcyclohexane, di (t-butyl-peroxy)diisopropylbenzene and 2,5-dimethyl 2,5-di-(t-butylperoxy)hexane. In this vulcanization system, sulfur, sulfur compounds such as dipentamethylenethiuram tetrasulfide, polyfunctional monomers such as ethylene dimethacrylate, divinylbenzene, diallyl phthalate, meta-phenylene bismaleimide and tolylene bismaleimide, and oxime compounds such as p-quinonedioxime and p,p'-dibenzoylquinoneoxime, etc. can be used as vulcanization aids either alone or as mixtures.

If desired, other additives may be used in compounding the rubbery copolymer of this invention. The other additives include activators, dispersing agents, fillers, softening agents, plasticizers, tackifiers, coloring agents, blowing agents, blowing promotors, lubricants, and antioxidants.

Specific examples of the activators are diethylene glycol and polyethylene oxide.

Examples of the dispersing agents are stearic acid, lauric acid, oleio acid and zinc stearate.

Examples of the fillers are inorganic fillers such as carbon black, white carbon (silicate compound), calcium carbonate, talc and clay, and organic fillers such as high styrene resins, coumarone-indene resin, phenolic resins, lignin, modified melamine resins and petroleum resins. The inorganic fillers are preferred.

Examples of the softening agents are petroleum-type softening agents such as process oil, lubricant, paraffin, liquid paraffin, petroleum asphalt and vaseline; coal tar-type softening agents such as coal tar and coal tar pitch; fat oils such as castor oil, linseed oil, colza oil and ooconut oil; tall oil; waxes such as beeswax, carnauba wax and lanolin; fatty acids and the salts thereof such as ricinoleic acid, palmitic acid, barium stearate, calcium stearate and zinc laurate; and synthetic polymeric materials such as petroleum resins.

Examples of the plasticizers are phthalate compounds, adipate compounds, sebacate compounds, and phosphoric acid compounds.

Examples of the tackifiers are coumarone-indene resin, terpene-phenol resin and xylene-formaldehyde resin.

Examples of the coloring agents are inorganic and organic pigments.

Examples of the blowing agents are sodium bicarbonate, ammonium carbonate, N,N'-dinitrosopentamethylene tetramine, azocarbonamide, azobisisobutyronitrile, benzenesulfonyl hydrazide, toluenesulfonyl hydrazide, calcium azide and p-toluenesulfonyl azide. Examples of the blowing promotors are salicyclic acid, phthalic acid and urea.

Examples of the lubricants are paraffin wax, stearic acid, stearamide, n-butyl stearate, ketone wax and stearyl alcohol.

Examples of the antioxidants are phenyl-$\beta$-naphthylamine, aldol-$\alpha$-naphthylamide, di-$\beta$-naphthyl-p- phenylene diamine, styrenated phenol, 2-mercaptobenzimidazole, and nickel dibutyl dithiocarbamate.

The amounts of these additives can be selected as required, and are, for example, up to about 10% by weight for the activators, up to about 10% by weight for the dispersing agents, up to about 300% by weight for the fillers, up to about 150 parts by weight for the softening agents, up to about 10% by weight for the plasticizers, up to about 20% by weight for the tackifiers up to about 15 % by weight for the coloring agents, up to about 25% by weight for the blowing agents, up to about 10% by weight for the blowing aids, up to about 5% by weight for the lubricants, and up to about 3% by weight for the antioxidants, all based on the weight of the rubbery copolymer.

In vulcanizing the rubbery ethylene/1-bentene/ polyene copolymer of this invention, the vulcanization conditions can be selected depending upon the type of the vulcanizing agent. Ususally, the vulcanization is carried out at a temperature of about 100° to about 250° C., preferably about 120° to about 200° C., for a period of about 10 minutes to about 60 minutes, preferably about 20 minutes to about 40 minutes. When vulcanization is carried out with peroxide systems, the vulcanization time should preferably be adjusted to about four times as long as the half-life period of the peroxide used.

The rubbery copolymer of this invention also has superior roll processability and extrusion processability. Even when the filler is incorporated in an amount larger than the maximum amount permitted according to the end use of a vulcanizate of a conventional rubbery ethylene/propylene/polyene copolymer, a vulcanizate obtained from the rubbery copolymer of this invention has high strength which is as feasible as the conventional rubbery copolymer of ethylene/propylene/polyene. Hence, vulcanizates can be produced at a lower cost. Incorporation of non-reinforcing fillers such as calcium carbonate, talc and clay, which are very low in cost, usually reduces the strength of the vulcanizate. However, even when such a filler is incorporated in a large amount into the rubbery copolymer of this invention, the strength of the copolymer is not significantly reduced. Accordingly, vulcanizates having equivalent strength to conventional rubbery copolymers of ethylene, propylene and polyenes can be produced at very low costs.

Thus, by selecting the type and amount of the filler, vulcanizates of high strength can be obtained from the rubbery copolymer of this invention. In addition, vulcanizates having equivalent strength to vulcanizates of conventional rubbery copolymers of ethylene, propylene and polyenes can be obtained at lower costs, and the vulcanizates exhibit superior rubbery properties.

The vulcanizates of the rubber copolymers of this invention, even when not filled with the fillers, exhibit superior strength characteristics. For example, when dicyclopentadiene or 5-vinyl-2-norbornene is selected as the polyene, the vulcanizates exhibit a tensile strength at break of usually at least 100 kg/cm$^2$, especially at least 120 kg/cm$^2$, and an elongation at break of at least 200%, especially at least 300%. When 5-ethylidene-2-norbornene is selected as the polyene, the vuloanizates in accordance with this invention usually exhibit a tensile strength of at least 150 kg/cm$^2$, especially at least 180 kg/cm$^2$, and an elongation of at least 200%, especially at least 300%. Incorporation of fillers leads to further improvement of these properties.

An excellent insulating covering in cylindrical form on a cable conductor for power transmission can be obtained from the rubbery copolymer of this invention by known methods usually employed. The insulating covering for high-voltage power transmission cables (more than 10,000 volts) is required to have a high level of electric characteristics and strength. Even when the amounts of the softening agent and/or plasticizer and fillers to be added to the rubbery copolymer of this invention are decreased, the rubber compound exhibits good extrusion processability such that in the process of extruding the rubber compound so as to cover in tubular form a cable conductor, the outside surface of the tubular covering retains sufficient smoothness. Thus, the insulating layer obtained by using the rubbery copolymer of this invention has sufficient resistance to AC breakdown voltage, and the tensile strength at break of the vulcanizate can be maintained at 100 kg/cm$^2$ or higher. Such an insulating layer is very useful for high-voltage power transmission cables, and can withstand high-voltage power transmission of about 70,000 volts at the highest.

With conventional rubber copolymers of ethylene, propylene and polyenes, insulating layers cannot be obtained which meet all of the requirements for strength, processability and electrical characteristics in a well-balanced combination. At best, the conventional insulating layers can be used for high-voltage power transmission of about 20,000 volts.

To produce such an insulating layer for power transmission cables, it is advisable to incorporate not more than 50 parts by weight, preferably not more than 30 parts by weight, of the filler and not more than 7 parts by weight, preferably not more than 5 parts by weight, of the softening agent and/or the plasticizer into 100 parts by weight of the rubbery copolymer of this invention.

Insulating layers for low-voltage power transmission cables and cables for ships, insulating layers for automobile ignition cables, electrical insulating parts around motor vehicle engines such as plug caps, ignition caps and distributor caps, and general electrical insulating component parts such as condenser caps or cable joint covers are not required to have so high a level of electrical characteristics. Thus, the filler can be added in an amount of at most 250 parts by weight, and the softening agent and/or the plasticizer, in an amount of at most 100 parts by weight, to the rubbery copolymer of this invention according to the strength required for each of such parts.

Needless to say, such electrical insulators preferably have an inherent volume resistivity of at least $1 \times 10^{14}$ ohms-cm. Thus, non-conductive fillers are preferred. When one is compelled to use carbon black, it is recommendable to adjust its amount to not more than 25 parts by weight, preferably not more than 5 parts by weight, per 100 parts by weight of the rubbery copolymer.

By vulcanizing the rubbery copolymer of this invention, exterior finishing parts of automobiles such as bumpers, bumper rub stops, hover riders and side protections can be produced. These parts have high strength, superior heat resistance, superior weatherability and rubbery properties. The amount (X parts by weight) of the softening agent and/or the plasticizer and the amount (Y parts) of the filler to be added at this time per 100 parts by weight of the rubbery copolymer should preferably satisfy the following relations.

$0 \leq X + Y \leq 300$ and $0 \leq X \leq 75$, preferably $0 \leq X + Y \leq 250$, and $0 \leq X \leq 50$.

Hoses, sheets such as roofings, and gaskets can also be produced by vulcanizing the rubbery copolymer of this invnetion.

By incorporating a blowing agent and vulcanizing the rubber compound, a foamed product having flexibility and high strength having a specific gravity strength ($kg/cm^2$) defined by TB/D where TB ($kg/cm^2$) is the strength at break of the foamed product and D is its apparent specific gravity, of at least 100 $kg/cm^2$. Such a foamed product is useful as a thermal insulating material, an electrical insulating material, a floating material, a cushioning material, or a sound-proofing material. Thus, the rubbery copolymer of this invention can afford materials having properties intermediate between those of a polyethylene foam and those of a foam of a rubbery ethylene/propylene/polyene copolymer.

The following Examples and Comparative Examples illustrate the present invention in more detail. All parts in these Examples are by weight.

EXAMPLE 1

Ethylene, 1 butene and dicyclopentadiene were continuously copolymerized in a 15-liter stainless steel polymerization vessel equipped with stirring impellers.

Specifically, hexane as a polymerization solvent was fed from the top of the polymerization vessel at a rate of 5 liters per hour. In the meanwhile, the polymer solution was continuously withdrawn from the bottom of the polymerization vessel so that the amount of the polymer solution in the vessel was always maintained at 5 liter.

As catalysts, (A) the reaction product between vanadium oxytrichloride and ethanol (prepared in a catalyst-preparing vessel so that the mole ratio of vanadium trichloride to ethanol became 1/1) and (B) a mixture of ethylaluminum sesquichloride, $(C_2H_5)_{1.5}AlCl_{1.5}$, and ethyl aluminum dichloride, $(C_2H_5)AlCl_2$, (prepared so that the mole ratio of ethylaluminum sesquichloride to ethyl aluminum dichloride became 7/3) were continuously fed into the polymerization vessel through its top portion so that the concentration of the vanadium atom and the concentration of the aluminum atom in the polymerization vessel reached 0.7 millimole/liter, and 7.0 millimoles/liter, respectively. From the top of the polymerization vessel, a gaseous mixture of ethylene and 1-butene (55% ethylene and 45 mole % of 1-butene.) was fed at a rate of 650 liters per hour, and hydrogen gas was fed at a rate of 1.3 liters per hour as a molecular weight controlling agent. Dicyclopentadiene was fed continuously at a rate of 30 g per hour from the top of the polymerization vessel. The copolymerization reaction was performed at 60° C. by circulating warm water through a jacket externally mounted on the polymerization vessel. The pressure inside the polymerization vessel was 7.2 $kg/cm^2$.G.

When the copolymerization reaction was performed under the conditions described above, a copolymer of ethylene, 1-butene and dicyclopentadiene was obtained as a uniform solution. A small amount of methanol was added to the polymer solution withdrawn from the bottom of the polymerization vessel to stop the polymerization reaction. The polymer was separated from the solvent by steam stripping, and dried under reduced pressure at 80° C. for one day.

The above procedure thus afforded the ethylene/1-butene/dicyclopentadiene copolymer at rate of 315 g per hour. During the reaction, no formation of gel inside the polymerization vessel was noted. The copolymer obtained had an ethylene content, measured by infrared absorption spectroscopy, of 90.2 mole % (the total content of ethylene and 1-butene was taken as 100 mole %), an intrinsic viscosity $[\eta]$, measured in decalin at 135°, of 1.34 dl/g, an iodine value of 9.6, a Q value of 2.7, a $g^*_\eta$ value of 0.62.

The polymer showed a tensile strength at break of 92 $kg/cm^2$, an elongation at break of 1080% and a JIS A hardness of 73, when measured in accordance with JIS K6301. A sheet, 1 mm thick, prepared by molding this copolymer had a haze of 4.8% measured in accordance with JIS K6714, indicating good transparency.

One hundred parts of the copolymer, 5 parts of zinc oxide, 1.5 parts of stearic acid, 55 parts of carbon black (SEAST H; a trademark for a produot of Tokai Electrode Mfg. Co., Ltd.), 10 parts of a naphthenic oil (SUNTHENE 4240, a trademark for a product of Japan Sun Oil Co., Ltd.), 0.5 part of 2-mercaptobenzothiazole, 1.5 parts of tetra methylphiuram monosulfide and 1.0 part of sulfur were compounded on an 8-inch open roll at a roll temperature of 50° C. or 30 minutes. The compound was tested for its extrudability by means of a capillary flow tester at 100° C. and at a shear rate of 20 $sec^{-1}$. The surface texture of the extrudate, as a measure for processability of the compound, was evaluated on a scale of the following five grades.

5: No surface unevenness, and good gloss
4: Scarcely any surface unevenness, and no gloss
3: Slight surface unevenness, and no gloss
2: Surface unevenness exists, and no gloss
1: Great surface unevenness, and no gloss at all The extrudability of the compound obtained in this Example was grade 5.

The compound was press-cured at 160° C. for 30 minutes, and the vulcanizate obtained was subjected to a tensile test in accordance with JIS K6301. The vulcanizate was found to have a 300% modulus of 155 $kg/cm^2$, a tensile strength at break of 294 $kg/cm^2$, an elongation at break of 500%, and a JIS A hardness of 84.

EXAMPLES 2 TO 10 AND COMPARATIVE EXAMPLES 1 TO 10

Example 1 was repeated except that the catalyst, the monomers and other polymerization conditions were changed as shown in Table 1. The properties of the rubbery copolymers and the vulcanizates obtained therefrom were as shown in Table 2.

TABLE 1

| Example (Ex.) or Comparative Example (CEx) | Vanadium compound | V concentration (mmol/l) | Al Compound | Al/V mol ratio | polyene (g/hr) | $C_2''/1\text{-}C_4''$ (mol/mol)·l/hr | $H_2$ (l/hr) | Polymerization temperature (°C.) | Remarks | Yield (g/hr) | $C_2''$ (mol %) | $[\eta]$ (dl/g) | Iodine value | Q value | $g_\eta^*$ |
|---|---|---|---|---|---|---|---|---|---|---|---|---|---|---|---|
| Ex. 1 | $VOCl_3$/EtOH = 1/1 reaction product | 0.7 | A/B = 7/3 | 10 | DCPD(30) | (55/45) 650 | 1.3 | 60 | | 315 | 90.2 | 1.34 | 9.6 | 2.7 | 0.62 |
| Ex. 2 | $VOCl_3$/EtOH = 1/1 reaction product | " | " | " | VNB (10) | (55/45) 650 | " | " | | 275 | 91.0 | 1.45 | 6.5 | 2.8 | 0.41 |
| Ex. 3 | $VOCl_3$/EtOH = 1/1.5 reaction product | " | " | " | DCPD(30) | (55/45) 650 | " | " | | 310 | 90.4 | 1.37 | 9.9 | 2.7 | 0.43 |
| Ex. 4 | $VOCl_3$/n-PrOH = 1/1 reaction product | " | " | " | " | (55/45) 650 | " | " | | 302 | 89.5 | 1.38 | 9.8 | 2.8 | 0.44 |
| Ex. 5 | $VOCl_3$/VO$(OEt)_3$ = 1/1 reaction product | " | " | " | " | (55/45) 650 | " | " | | 312 | 90.0 | 1.35 | 9.4 | 2.7 | 0.38 |
| Ex. 6 | $VOCl_3$/EtOH = 1/1 reaction product | " | " | " | " | (58/42) 650 | 1.8 | " | | 348 | 94.2 | 1.42 | 8.4 | 2.7 | 0.65 |
| Ex. 7 | $VOCl_3$/EtOH = 1/1 reaction product | " | " | " | " | (50/50) 650 | 1.0 | " | | 273 | 86.7 | 1.28 | 10.8 | 2.7 | 0.59 |
| Ex. 8 | $VOCl_3$/EtOH = 1/1 reaction product | " | " | 15 | " | (55/45) 650 | 1.3 | " | | 318 | 90.3 | 1.36 | 9.5 | 2.6 | 0.43 |
| Ex. 9 | $VOCl_3$/EtOH = 1/1 reaction product | 1.2 | " | 10 | " | (55/45) 650 | 0.5 | 80 | | 290 | 90.5 | 1.29 | 10.5 | 2.8 | 0.46 |
| Ex. 10 | $VOCl_3$/EtOH = 1/1 reaction product | 0.7 | A/B = 5/5 | " | " | (55/45) 650 | 1.3 | 60 | | 314 | 89.4 | 1.34 | 9.3 | 2.8 | 0.54 |
| CEx. 1 | $VOCl_3$ | " | A | " | DCPD(25) | (50/50) 650 | 1.5 | " | Gel formed | 220 | 91.2 | 1.38 | 11.4 | 3.8 | 0.64 |
| CEx. 2 | " | " | A/B = 7/3 | " | " | (50/50) 650 | " | " | Gel formed in a small amount | 245 | 89.5 | 1.35 | 10.9 | 3.2 | 0.56 |
| CEx. 3 | " | " | B | " | " | (50/50) 650 | " | " | Gel formed | 253 | 90.4 | 1.27 | 11.0 | 6.3 | 0.61 |

TABLE 1-continued

| Example (Ex.) or Comparative Example (CEx) | Vanadium compound | V concentration (mmol/l) | Al Compound | Al/V mol ratio | polyene (g/hr) | $C_2''/1-C_4''$ (mol/mol)· l/hr | $H_2$ (l/hr) | Polymerization temperature (°C.) | Remarks | Yield (g/hr) | $C_2''$ (mol %) | $[\eta]$ (dl/g) | Iodine value | Q value | $g_\eta^*$ |
|---|---|---|---|---|---|---|---|---|---|---|---|---|---|---|---|
| CEx. 4 | VOCl$_3$/ EtOH = 1/1 reaction product | " | A | " | DCPD(30) | (55/45) 650 | 1.3 | " | Gel formed | 285 | 89.8 | 1.41 | 10.0 | 3.5 | 0.48 |
| CEx. 5 | VOCl$_3$/ EtOH = 1/1 reaction product | " | B | " | " | (55/45) 650 | " | " | Gel formed | 294 | 88.7 | 1.26 | 10.1 | 4.8 | 0.56 |
| CEx. 6 | VOCl$_3$/ EtOH = 1/1 reaction product | " | A/B = 7/3 | 4 | " | (55/45) 650 | " | " | Gel formed | 320 | 90.3 | 1.32 | 9.4 | 4.3 | 0.62 |
| CEx. 7 | VOCl$_3$/ EtOH = 1/1 reaction product | " | " | 10 | DCPD(25) | (45/55) 650 | 0.3 | " | Gel formed | 251 | 82.4 | 1.40 | 10.5 | 2.7 | 0.63 |
| CEx. 8 | VOCl$_3$/ EtOH = 1/1 reaction product | 0.5 | " | 10 | DCPD(30) | (62/38) 650 | 2.5 | " | Gel formed | 303 | 97.1 | 1.29 | 9.8 | 2.7 | 0.65 |
| CEx. 9 | VOCl$_3$/ EtOH = 1/1 reaction product | 0.2 | " | 10 | " | (40/60) 650 | 4.0 | 30 | Gel formed | 265 | 89.4 | 1.43 | 10.4 | 3.7 | 0.60 |
| CEx. 10 | VOCl$_3$/ EtOH = 1/1 reaction product | 0.5 | " | 10 | " | $C_2''/C_3'''$ (60/40) 650 | 2.5 | 60 | Gel formed | 308 | 88.4 | 1.33 | 9.3 | 3.5 | 0.64 |

Et: ethyl,
Pr: propyl.
A: ethylaluminum sesquichloride,
B: ethylaluminum dichloride
DCPD: dicyclopentadiene,
VNB: 5-vinyl-2-norbornene,
$C_2''$ mol %: $\dfrac{\text{ethylene}}{\text{ethylene + 1-butene}} \times 100$ mol % (in the copolymer)
$C_3'''$: propylene

TABLE 2

| Example (Ex.) or Comparative Example (CEx.) | Properties of the uncured rubbery copolymer | | | | Extrudability or the rubber compound | Properties of the vulcanizate | | | |
|---|---|---|---|---|---|---|---|---|---|
| | TB (kg/cm$^2$) | EB (%) | HS JIS A | Haze (%) | | M$_{300}$ (kg/cm$^2$) | TB (kg/cm$^2$) | EB (%) | HS JIS A |
| Ex. | | | | | | | | | |
| 1 | 92 | 1080 | 73 | 4.8 | 5 | 155 | 294 | 500 | 84 |
| 2 | 76 | 1200 | 71 | 4.6 | 5 | 144 | 270 | 520 | 80 |
| 3 | 89 | 1050 | 73 | 5.2 | 5 | 150 | 285 | 510 | 83 |
| 4 | 85 | 1140 | 72 | 4.5 | 5 | 138 | 290 | 540 | 82 |
| 5 | 93 | 1000 | 72 | 4.8 | 5 | 148 | 278 | 530 | 83 |
| 6 | 195 | 840 | 84 | 10.8 | 5 | 165 | 325 | 400 | 89 |
| 7 | 35 | 920 | 57 | 4.2 | 5 | 69 | 184 | 620 | 68 |
| 8 | 90 | 1020 | 72 | 4.7 | 5 | 163 | 280 | 480 | 84 |
| 9 | 84 | 930 | 73 | 5.4 | 5 | 130 | 273 | 550 | 82 |
| 10 | 73 | 1100 | 71 | 6.6 | 5 | 128 | 275 | 580 | 80 |
| CEx. | | | | | | | | | |
| 1 | 38 | 1320 | 71 | 25.2 | 5 | 81 | 180 | 520 | 82 |
| 2 | 45 | 1200 | 71 | 21.2 | 5 | 85 | 195 | 530 | 83 |
| 3 | 40 | 1360 | 73 | 22.4 | 5 | 94 | 183 | 550 | 83 |
| 4 | 54 | 980 | 71 | 19.5 | 5 | 113 | 210 | 490 | 82 |
| 5 | 51 | 1120 | 72 | 20.3 | 5 | 105 | 205 | 550 | 82 |
| 6 | 63 | 960 | 68 | 17.8 | 5 | 92 | 186 | 580 | 79 |
| 7 | 20 | 1200 | 46 | 4.1 | 4 | 41 | 135 | 590 | 57 |
| 8 | 95 | 640 | 91 | 35.6 | 3 | 172 | 318 | 380 | 95 |
| 9 | 74 | 1040 | 70 | 15.5 | 4 | 120 | 245 | 540 | 82 |
| 10 | 60 | 560 | 88 | 45.5 | 3 | 107 | 182 | 390 | 94 |

EXAMPLE 11

800 g of each of the copolymers obtained in Examples 1, 6 and 7 was compounded in accordance with the recipe shown in Table 3 by means of 8-inch open rolls (the front roll temperature 75° C.; the back roll temperature 80° C.) for 20 minutes to form an uncured rubber compound.

The rubber compound was heated at a pressure of 150 kg/cm$^2$ for 30 minutes by means of a press heated at 160° C. to form a vulcanized sheet having an area of 14 cm × 12 cm and a thickness of 2 mm. JIS No. 3 dumbbell samples were punched out from the resulting sheet, and tested at a tensile speed of 500 mm/min. in an atmosphere kept at 25° C. in accordance with the method of JIS K6301 for tensile strength at break, TB, (kg/cm$^2$) and an elongation at break, EB, (%), and also for hardness, HS, (JIS A).

Samples were taken from the vulcanized sheet, and the AC breakdown voltage and dielectric disspiation factor (at 25° C. and 500 V) of the samples were measured at a voltage increasing rate of 1 KV/sec. by the Schering bridge method.

Separately, the above uncured rubber compound was fed into a 50 mm extruder (L/D=10, compression ratio=6, Garbey die), and extruded at an extrusion temperature of 105° C. and a rotation speed of 40 rpm. The appearance of the resulting strand was observed, and its surface texture as a measure for extrusion processability was evaluated in the same way as in Example 1.

The results are shown in Table 4.

TABLE 3

| Compounding ingredients | Amounts (parts) |
|---|---|
| Rubbery copolymer | 100 |
| Zinc oxide | 5 |
| Stearic acid | 1 |
| Talc (*1) | 30 |
| Carbon black (*2) | 3 |
| Paraffin oil (*3) | 5 |
| Dicumyl peroxide | 2.7 |

TABLE 3-continued

| Compounding ingredients | Amounts (parts) |
|---|---|
| p,p'-Dibenzoylquinone dioxime | 3.5 |

(*1): Mistron Vapor Talc (a trademark for a product of Sierra Talc Co., Ltd.)
(*2): SEAST S (a trademark for a product of Tokai Electrode Mfg., Co., Ltd.)
(*3): P-200 (a trademark for a product of Kyodo Oil Co., Ltd.)

TABLE 4

| Rubber | Properties of the vulcanized rubber | | |
|---|---|---|---|
| | Example 1 | Example 6 | Example 7 |
| TB (kg/cm$^2$) | 182 | 230 | 145 |
| EB (%) | 550 | 560 | 550 |
| HS | 83 | 87 | 73 |
| AC breakdown voltage (KV/mm) | 40 | 42 | 40 |
| Dielectric dissipation factor (%) | 0.23 | 0.22 | 0.25 |
| Surface texture of the extrudate | 5 | 5 | 5 |

EXAMPLE 12

The copolymer obtained in Example 1 had an I value (a measure for extrudability), measured in the following manner, of 55.

Using a capillary flow tester, the rubbery copolymer was extruded under two different extrusion stresses ($S_1 = 1 \times 10^6$ dynes/cm$^2$, $S_2 = 1 \times 10^5$ dynes/cm$^2$) for a certain period of time at 100° C., and the amounts of the copolymer extruded, $M_1$ and $M_2$, were measured respectively. The I value of the copolymer is defined as $M_1/M_2$. Larger I values show better extrudability.

The rubbery copolymers of this invention have an I value of at least 20, preferably at least 30.

A pure rubber compound resulting from exclusion of carbon black and naphthenic oil from the compounding recipe of Example 1 was press-cured at 160° C. for 30 minutes, and the vulcanizate was subjected to a tensile test in accordance with JIS K6301.

The vulcanizate was found to have a tensile strength at break of 250 kg/cm$^2$ and an elongation at break of 680%.

EXAMPLE 13 AND COMPARATIVE EXAMPLES 11 TO 15

Example 1 was repeated under various polymerization conditions shown in Table 5, and the resulting copolymers were evaluated in the same way as in Example 1. The results are shown in Tables 5 and 6.

TABLE 5

| Example (Ex.) or Comparative Example (CEx) | Vanadium compound | V concentration (mmol/l) | Al compound | Al/V mol ratio | Polyene (g/hr) | $C_2''/1\text{-}C_4''$ (mol/mol) · l/hr |
|---|---|---|---|---|---|---|
| Ex. 13 | VOCl$_3$/EtOH = 1/1 reaction product | 1.0 | A/B = 7/3 | 10 | DCPD(50) | (55/45) · 650 |
| CEx. 11 | VOCl$_3$/EtOH = 1/1 reaction product | 1.0 | " | " | 1,4-hexadiene (50) | (50/50) · 650 |
| CEx. 12 | VOCl$_3$/EtOH = 1/1 reaction product | 1.0 | " | " | methyl-tetrahydroindene (50) | (50/50) · 650 |
| CEx. 13 | VOCl$_3$/EtOH = 1/1 reaction product | 0.7 | " | " | 5-isopropenyl-2-norbornene (18) | (55/45) · 650 |
| CEx. 14 | VOCl$_3$/EtOH = 1/1 reaction product | 0.7 | " | " | DCPD(25) | (45/55) · 650 |
| CEx. 15 | VOCl$_3$/EtOH = 1/1 reaction product | 0.5 | " | " | DCPD(30) | (62/38) · 650 |

| Example (Ex.) or Comparative Example (CEx) | H$_2$ (l/hr) | Polymerization temperature (°C.) | Yield (g/hr) | $C_2''$ (mol %) | [η] (dl/g) | Iodine value | Q value | $g_\eta^*$ |
|---|---|---|---|---|---|---|---|---|
| Ex. 13 | 0.8 | 60 | 298 | 88.4 | 1.30 | 17.2 | 2.9 | 0.43 |
| CEx. 11 | 0.5 | " | 243 | 90.8 | 1.25 | 7.4 | 2.5 | 0.93 |
| CEx. 12 | 0.5 | " | 254 | 89.4 | 1.23 | 8.2 | 2.3 | 0.91 |
| CEx. 13 | 1.5 | " | 350 | 89.6 | 1.38 | 10.5 | 2.3 | 0.92 |
| CEx. 14 | 0.3 | " | 251 | 82.4 | 1.40 | 10.5 | 2.7 | 0.63 |
| CEx. 15 | 2.5 | " | 303 | 97.1 | 1.29 | 9.8 | 2.7 | 0.65 |

EtOH: ethanol,
A: ethylaluminum sesquichloride,
B: ethylaluminum dichloride,
DCPD: dicyclopentadiene, $C_2''$: ethylene content in the copolymer $\left( \dfrac{\text{ethylene}}{\text{ethylene} + \text{1-butene}} \times 100 \right)$

TABLE 6

| Example (Ex.) or Comparative Example (CEx.) | Properties of the uncured rubbery copolymer | | | | Properties of the vulcanizate | | | | | |
|---|---|---|---|---|---|---|---|---|---|---|
| | | | | | Reinforced rubber formulation | | | | Pure rubber formulation | |
| | TB (kg/cm$^2$) | EB (%) | HS JIS A | I value | M$_{300}$ (kg/cm$^2$) | TB (kg/cm$^2$) | EB (%) | HS JIS A | TB (kg/cm$^2$) | EB (%) |
| Ex. 13 | 74 | 880 | 70 | 93 | 115 | 250 | 480 | 83 | 220 | 510 |
| CEx. 11 | 84 | 1150 | 72 | 16 | 140 | 274 | 500 | 83 | 205 | 700 |
| CEx. 12 | 76 | 1200 | 70 | 15 | 128 | 256 | 520 | 82 | 228 | 700 |
| CEx. 13 | 90 | 1100 | 72 | 13 | 150 | 285 | 540 | 84 | 245 | 650 |
| CEx. 14 | 20 | 1200 | 46 | 51 | 41 | 135 | 590 | 57 | 35 | 820 |
| CEx. 15 | 95 | 640 | 91 | 40 | 172 | 318 | 380 | 95 | 260 | 470 |

EXAMPLE 14

Ethylene, 1-butene and 5-ethylidene-2-norbornene were copolymerized continuously in a 15-liter stainless steel polymerization vessel equipped with stirring impellers.

Specifically, hexane as a polymerization solvent was continuously fed from the top of the polymerization vessel at a rate of 5 liters per hour. In the meanwhile, the polymer solution was continuously withdrawn from the bottom of the vessel so that the amount of the polymer solution in the vessel was always maintained at 5 liters.

As catalysts, (A) the reaction product between vanadium oxytrichloride and ethanol (prepared in a catalyst preparing vessel so that the mole ratio of vanadium oxytrichloride to ethanol was (1/1), and (B) a mixture of ethyl aluminum sesquichloride, (C$_2$H$_5$)$_{1.5}$AlCl$_{1.5}$, and ethyl aluminum dichloride, (C$_2$H$_5$)AlCl$_2$, (prepared so that the mole ratio of ethyl aluminum sesquichloride to ethyl aluminum dichloride was 7/3) were continuously fed into the polymerization vessel through its top portion so that the concentration of vanadium atom and the concentration of aluminum atom in the vessel were 0.7 millimole/liter and 7.0 millimoles/liter, respectively. From the top of the polymerization vessel, a gaseous mixture of 55 mole % of ethylene and 45 mole % of 1-butene was introduced at a rate of 650 liters per hour, and as a molecular weight controlling agent, hydrogen was fed at a rate of 1.5 liters per hour. From the top of the polymerization vessel, 5-ethylidene-2-norbornene was fed continuously at a rate of 18 g per hour.

The copolymerization reaction was performed at 60° C. by circulating warm water through a jacket mounted externally on the polymerization vessel. At this time, the pressure of the inside of the polymerization vessel was 6.4 kg/cm$^2$.G.

When the copolymerization was performed under the conditions described above, an ethylene/1-butene/5-ethylidene-2-norbornene copolymer was obtained as a uniform solution. A small amount of methanol was added to the polymer solution withdrawn from the bottom of the polymerization vessel to stop the polymerization reaction. The polymer was separated from the solvent by steam stripping, and then dried at 80° C. under reduced pressure for one day.

The above procedure afforded the ethylene/1-butene/5-ethylidene-2-norbornene copolymer at a rate of 368 g per hour.

The copolymer had an ethylene content, measured by infrared absorption spectroscopy, of 88.9 mole %, an intrinsic viscosity [$\eta$], measured in decalin at 135° C., of 1.33 dl/g, an iodine value of 10.3, and a Q value of 2.3.

A sheet, 1 mm thick, prepared from the copolymer in accordance with JIS K6758 had a tensile strength at break of 103 kg/cm$^2$, an elongation at break of 1050%, and a JIS A hardness of 74, when measured in accordance with JIS K6301.

One hundred parts of the copolymer, 5 parts of zinc oxide, 1.5 parts of stearic acid, 55 parts of carbon black (SEAST H, a product of Tokai Electrode Mfg., Co., Ltd.), a naphthenic oil (SUNTHENE 4240, a product of Japan Sun Oil Co., Ltd.), 0.5 part of tetramethylthiuram monosulfide and 1.0 part of sulfur were compounded on 8-inch open rolls (roll temperature 50° C.) for 30 minutes to form a rubber compound.

The rate of cure ($T_{10}$) of the rubber compound was measured by the following procedure. The torque of the rubber compound was measured at 130° C. using a JSR curelastometer (amplitude $\pm 3°$, frequency 6 cpm.). The maximum torque was designated $F_{max.}$ and the minimum torque, $F_{min.}$. The time from the starting of measurement to a point at which the torque became $F_{min.} + 0.1 (F_{max.} - F_{min.})$ was measured, and expressed as $T_{10}$. $T_{10}$ is an important measure for expressing the speed of vulcanization of the rubber compound. In this Example, the rubber compound had a $T_{10}$ of 9 minutes and 10 seconds.

The rubber compound was press-cured at 160° C. for 30 minutes, and the resulting vulcanizate was subjected to a tensile test in accordance with JIS K6301. The vulcanizate was found to have a 300% modulus of 170 kg/cm$^2$, a tensile strength at break of 300 kg/cm$^2$, an elongation at break of 450%, and a JIS A hardness of 85.

A pure rubber compound resulting from the exclusion of carbon black and naphthenic oil from the above compounding recipe was press-cured at 160° C. for 30 minutes, and the vulcanizate was subjected to a tensile test in accordance with JIS K6301. The vulcanizate was found to have a tensile strength at break of 278 kg/cm$^2$ and an elongation at break of 630%.

EXAMPLES 15 TO 21 AND COMPARATIVE EXAMPLES 16 TO 20

Example 14 was repeated under various polymerization conditions, and the resulting copolymers were evaluated in the same way as in Example 14. The polymerization conditions, the properties of the copolymers and other data are shown in Tables 7 and 8.

TABLE 7

| Example (Ex.) or Comparative Example (CEx.) | V compound | V concentration (mmol/l) | Al compound | Al/V mole ratio | Polyene (g/hr) | $C_2''/1\text{-}C_4''$ (mol/mol) · l/hr | $H_2$ (l/hr) | Polymerization temperature (°C.) | Yield (g/hr) |
|---|---|---|---|---|---|---|---|---|---|
| Ex. 15 | VOCl$_3$/EtOH = 1/1 reaction product | 0.7 | A/B = 7/3 | 10 | ENB(18) | (55/45) · 650 | 1.5 | 60 | 368 |
| Ex. 16 | VOCl$_3$/EtOH = 1/1 reaction product | " | " | " | " | " | 0.5 | " | 346 |
| Ex. 17 | VOCl$_3$/EtOH = 1/1 reaction product | " | " | " | " | " | 3.0 | " | 382 |
| Ex. 18 | VOCl$_3$/EtOH = 1/1 reaction product | 0.5 | " | " | " | (62/38) · 650 | 2.5 | " | 355 |
| Ex. 19 | VOCl$_3$/EtOH = 1/1 reaction product | 0.7 | " | " | " | (50/50) · 650 | 1.0 | " | 290 |
| Ex. 20 | VOCl$_3$/EtOH = 1/1 reaction product | 1.0 | " | " | ENB(40) | (55/45) · 650 | 2.0 | " | 347 |
| Ex. 21 | VOCl$_3$/EtOH = 1/1 reaction product | 0.7 | " | " | ENB(10) | " | 1.0 | " | 384 |
| CEx. 16 | VOCl$_3$/EtOH = 1/1 reaction product | " | " | " | ENB(18) | (55/45) · 650 | 5.0 | " | 396 |
| CEx. 17 | VOCl$_3$/EtOH = 1/1 reaction product | " | " | " | " | (45/55) · 650 | 0.3 | " | 290 |
| CEx. 18 | VOCl$_3$/EtOH = 1/1 reaction product | " | " | 4 | " | (55/45) · 650 | 1.5 | " | 372 |

TABLE 7-continued

| Example (Ex.) or Comparative Example (CEx.) | V compound | V concentration (mmol/l) | Al compound | Al/V mole ratio | Polyene (g/hr) | $C_2''/1-C_4''$ (mol/mol) · l/hr | $H_2$ (l/hr) | Polymerization temperature (°C.) | Yield (g/hr) |
| --- | --- | --- | --- | --- | --- | --- | --- | --- | --- |
| CEx. 19 | $VOCl_3$ | " | A | 10 | ENB(15) | (55/50) · 650 | 2.0 | " | 261 |
| CEx. 20 | $VOCl_3$/EtOH = 1/1 reaction product | 0.5 | A/B = 7/3 | " | ENB(18) | $C_2''/C_3''$(62/38) · 650 | 3.0 | " | 353 |

EtOH: ethanol,
A: ethylaluminum sesquichloride,
B: ethylaluminum dichloride,
ENB: 5-ethylidene-2-norbornene,
$C_3''$: propylene

TABLE 8

| Example (Ex.) or Comparative Example (CEx.) | Properties of the uncured rubber copolymer | | | | | | | Rate of vulcanization $T_{10}$ (min., sec.) | Properties of the vulcanizate | | | | | |
| --- | --- | --- | --- | --- | --- | --- | --- | --- | --- | --- | --- | --- | --- | --- |
| | | | | | | | | | Reinforced rubber formulation | | | | Pure rubber formulation | |
| | $C_2''$ (mol %) | [η] (dl/g) | I.V. | Q | TB (kg/cm²) | EB (%) | EB JIS A | | $M_{300}$ (kg/cm²) | TB (kg/cm²) | EB (%) | HS JIS A | TB (kg/cm²) | EB (%) |
| Ex. 15 | 88.9 | 1.33 | 10.3 | 2.3 | 103 | 1050 | 74 | 9'10" | 170 | 330 | 450 | 85 | 278 | 630 |
| Ex. 16 | 88.4 | 2.52 | 10.8 | 2.4 | 215 | 840 | 74 | 9'03" | 235 | 350 | 430 | 85 | 295 | 580 |
| Ex. 17 | 90.3 | 1.07 | 9.4 | 2.3 | 85 | 920 | 75 | 10'18" | 123 | 246 | 620 | 84 | 212 | 540 |
| Ex. 18 | 93.8 | 1.34 | 9.9 | 2.4 | 228 | 960 | 82 | 10'03" | 225 | 350 | 400 | 88 | 278 | 560 |
| Ex. 19 | 86.4 | 1.48 | 11.7 | 2.2 | 65 | 1020 | 62 | 8'23" | 95 | 234 | 590 | 65 | 186 | 720 |
| Ex. 20 | 89.3 | 1.42 | 24.0 | 2.4 | 90 | 720 | 72 | 6'15" | 132 | 255 | 380 | 87 | 193 | 470 |
| Ex. 21 | 89.6 | 1.31 | 5.5 | 2.2 | 134 | 1080 | 75 | 13'28" | 154 | 307 | 740 | 82 | 264 | 650 |
| CEx. 16 | 87.8 | 0.70 | 9.0 | 2.4 | 46 | 1200 | 65 | 11'55" | 65 | 138 | 550 | 74 | 120 | 640 |
| CEx. 17 | 81.8 | 1.42 | 11.4 | 2.5 | 38 | 1100 | 46 | 11'02" | 65 | 168 | 530 | 56 | 48 | 800 |
| CEx. 18 | 89.4 | 1.40 | 10.4 | 4.1 | 79 | 880 | 68 | 14'10" | 100 | 204 | 550 | 77 | 105 | 680 |
| CEx. 19 | 90.2 | 1.38 | 11.0 | 5.2 | 58 | 1080 | 70 | 11'06" | 87 | 192 | 500 | 81 | 95 | 600 |
| CEx. 20 | 89.4 | 1.25 | 9.6 | 3.3 | 64 | 530 | 89 | 11'40" | 112 | 184 | 390 | 95 | 94 | 420 |

I.V. = iodine value

EXAMPLE 22

Using 800 g of each of the copolymers obtained in Examples 15, 18 and 19, an uncured rubber compounds was prepared by kneading on 8-inch rolls (the front roll temperature 75° C., the back roll temperature 80° C.) for 20 minutes in accordance with the recipe shown in Table 9.

The rubber compound was heated for 30 minutes at 150 kg/cm² by means of a press heated at 160° C. to form a vulcanized sheet having an area of 14 cm × 12 cm and a thickness of 2 mm. JIS No. 3 dumbell samples were punched out from the sheet, and tested at a tensile speed of 500 mm/min. in an atmosphere kept at 25° C. by the method set out in JIS K6301 for tensile strength at break, TB, (kg/cm²) and elongation at break, EB, (%) Furthermore, the hardness, HS (JIS A), of the sample was measured in accordance with the stipulations of JIS.

Samples were taken from the vulacanized sheet, and their ac breakdown voltage and dielectric dissipation factor (at 25° C. and 500 V) were measured at a voltage raising rate of 1 KV/sec. by the Schering bridge method.

Separately, the uncured rubber compound was fed into a 50 mm extruder (L/D=10, compression ratio=6, Garbey die), and extruded at an extrusion temperature of 105° C. and a rotating speed of 40 rpm. The appearance of the surface of the resulting strand was observed, and its surface texture as a measure for extrusion processability was evaluated in the same way as in Example 1.

The results are shown in Table 10.

TABLE 9

| Compounding ingredients | Amount (parts) |
| --- | --- |
| Rubbery copolymer | 100 |
| Zinc oxide | 5 |
| Stearic acid | 1 |
| Talc (*1) | 30 |
| Carbon black (*3) | 3 |
| Paraffin oil (*3) | 5 |
| Dicumyl peroxide | 2.7 |
| p,p'-Dibenzoylquinone dioxime | 3.5 |

(*1), (*2) and (*3): The same as the footnote to Table 3.

TABLE 10

| Copolymer | Properties of vulcanized rubbers | | |
| --- | --- | --- | --- |
| | Example 15 | Example 18 | Example 19 |
| TB | 172 | 235 | 150 |
| EB | 450 | 480 | 460 |
| HS | 82 | 87 | 75 |
| AC breakdown voltage | 40 | 41 | 40 |
| Dielectric dissipation factor | 0.22 | 0.21 | 0.23 |
| Surface texture of the extrudate | 4 | 4 | 4 |

What we claim is:

1. A process for producing a rubbery copolymer of ethylene, 1-butene and a polyene having (A) an ethylene/1-butene mole ratio of from 86/14 to 95/5, (B) an iodine value of from 2 to 40, (C) an intrinsic viscosity [η], measured in decalin at 135° C., of from 0.8 to 4 dl/g, (D) a weight average molecular weight/number average molecular weight ratio (M̄w/M̄n) of less than 3, (E) [η]/[η]l of from 0.2 to 0.9 in which [η] is the intrinsic viscosity of the copolymer and [η]l is the intrinsic viscosity of an ethylene/1-butene random copolymer having an ethylene content of 90 mole % and the same weight average molecular weight, determined by a light scattering method, as that of the rubbery copolymer and (F) the polyene is at least one member selected from the group consisting of dicyclopentadiene, 5-vinyl-2-norbornene and 5-ethylidene-2-norbornene; which comprises copolymerizing ethylene, 1-butene and the polyene in an inert hydrocarbon medium at a temperature of from about 40° C. to about [100° C.] 80° C., and at a pressure of from atmospheric pressure to 20 kg/cm².G in the presence of a catalyst consisting essentially of (a) a vanadium compound of the formula

wherein R represents a $C_1$–$C_{20}$ alkyl group, X represents a halogen atom, and n represents a positive number within the range of $1 \leq n \leq 1.5$, wherein said vanadium compound (a) is at least one compound selected from the group consisting of VO(OCH$_3$)Cl$_2$, VO(OC$_2$H$_5$)Cl$_2$, VO(OC$_2$H$_5$)$_{1.5}$Cl$_{1.5}$, VO(OC$_2$H$_5$)$_{1.5}$Br$_{1.5}$, VO(OC$_3$H$_7$)Cl$_2$, VO(OC$_3$H$_7$)$_{1.5}$Cl$_{1.5}$, VO(O n-C$_4$H$_9$)Cl$_2$, and VO(OC$_5$H$_{11}$)$_{1.5}$Cl$_{1.5}$, and (b) an organoaluminum compound of the formula

wherein R' represent a hydrocarbon group X' represents a halogen atom, and m represents a positive number within the range of $1.2 \leq m \leq 1.4$, wherein said organoaluminum compound is a mixture of of C$_2$H$_5$AlCl$_2$ and (C$_2$H$_5$)$_{1.5}$AlCl$_{1.5}$, a mixture of iso-C$_4$H$_9$AlCl$_2$ and (iso-C$_4$H$_9$)$_{1.5}$AlCl$_{1.5}$, or a mixture of C$_2$H$_5$AlCl$_2$ and (iso-C$_4$H$_9$)$_{1.5}$AlCl$_{1.5}$, the Al/V mole ratio in the catalyst being from 5 to 20.

2. The process of claim 1 wherein the concentration of the vanadium compound (a) is 0.01 to 5 millimoles/liter medium.

3. The process of claim 1 wherein R and R' each independently of the other, represents an alkyl group having from 1 to 3 carbon atoms and X' represents chlorine or bromine.

4. The process of claim 3 wherein the copolymerization is carried out under conditions in which the concentration of the vanadium compound (a) is from 0.1 to 2 millimoles/liter, the amount of the organoaluminum compound (b) is adjusted such that the Al/V mole ratio is from 7 to 20, the polymerization temperature is from 50° to 80° C. and the polymerization pressure is from atmospheric pressure to 20 kg/cm².G.

5. A process for producing a rubbery copolymer of ethylene, 1-butene and a polyene having (A) an ethylene/1-butene mole ratio of from 86/14 to 95/5, (B) an iodine value of from 2 to 40(C) an intrinsic viscosity [η], measured in decalin at 135° C., of from 0.8 to 4 dl/g, (D) a weight average molecular weight/number average molecular weight ratio ($\overline{M}w/\overline{M}n$) of less than 3, (E) [η]/[η]l of from 0.2 to 0.9 in which [η]is the intrinsic viscosity of the copolymer and [η]l is the intrinsic viscosity of an ethylene/1-butene random copolymer having an ethylen content of 90 mole % and the same weight average molecular weight, determined by a light scattering method, as that of the rubbery copolymer and (F) the polyene is dicyclopentadiene or 5-vinyl-2-norbornene which comprises copolymerizing ethylene, 1-butene and the polyene in an inert hydrocarbon medium at a temperature of from about 60° C. to about 80° C. and at a pressure of about 7 kg/cm².G in the presence of a catalyst consisting essentially of (a) a vanadium compound which is selected from the group consisting of a reaction product of vanadium oxytrichloride with ethanol at a mole ratio of from about 1/1 to about 1/1.5, the reaction product of vanadium oxytrichloride with n-propanol at a mole ratio of about 1/1, of the reaction product of vanadium oxytrichloride with VO(OC$_2$H$_5$)$_3$ at a mole ratio of about 1/1, and (b) an organoaluminum compound which is a mixture of ethylaluminum sesquichloride and ethylaluminum dichloride at a mole ratio of about 7/3 to about 5/5, the vanadium compound (a) and the organoaluminum compound (b) being present in concentrations sufficient to provide an Al/V mole ratio of from about 10/1 to about 15/1.

6. A process for producing a rubbery copolymer of ethylene, 1-butene and a polyene having (A) an ethylene/1-butene mole ratio of from 86/14 to 95/5, (B) an iodine value of from 2 to 40, an intrinsic viscosity [η], measured in decalin at 135° C. (C), of from 0.8 to 4 dl/g, (D) a weight average molecular weight/number average molecular weight ratio ($\overline{M}w/\overline{M}n$) of less than 3, (E) [η]/[η]l of from 0.2 to 0.9 in which [η] is the intrinsic viscosity of the copolymer and [η]l is the intrinsic viscosity of an ethylene/1-butene random copolymer having an ethylene content of 90 mole % and the same weight average molecular weight, determined by a light scattering method, as that of the rubbery copolymer and (F) the polyene is 5-ethylidene 2-norbornene, which comprises copolymerizing ethylene, 1-butene and the polyene in an inert hydrocarbon medium at a temperature of about 60° C. and a pressure of about 6.4 kg/cm².G in the presence of a catalyst consisting essentially of (a) a vanadium compound which is the reaction product between vanadium oxytrichloride and ethanol at a mole ratio of about 1/1, and (b) an organoaluminum compound which is a mixture of ethylaluminum sesquichloride compound and ethylaluminum dichloride at a mole ratio of about 7/3, wherein the concentration of the vanadium compound and the organoaluminum compound in the copolymerization is such that the Al/V mole ratio is about 10/1.

7. The process of claim 5 wherein said rubbery copolymer is characterized by (A) an ethylene content of from 86.7 to 94.2 mole %, (B) an iodine value of from 6.5 to 10.8, (C) an intrinsic viscosity of from 1.28 to 1.45 dl/g, (D) a weight average molecular weight/number average molecular weight ratio of from about 2.6 to 2.8, (E) [72 ]/[η]l of from 0.38 to 0.65.

8. The process of claim 6 wherein the rubbery copolymer is characterized by (A) an ethylene content of from 86.4 to 93.8 mole %, (B) an iodine value of from 5.5 to 24.0, (C) an intrinsic viscosity of from 1.07 to 2.52, and (D) a weight average molecular weight/number average molecular weight ratio of from about 2.2 to 2.4.

* * * * *

UNITED STATES PATENT AND TRADEMARK OFFICE
CERTIFICATE OF CORRECTION

PATENT NO. : 4,588,794
DATED : May 13, 1986
INVENTOR(S) : HIDEKUNI ODA, ET AL.

It is certified that error appears in the above-identified patent and that said Letters Patent is hereby corrected as shown below:

IN THE CLAIMS

Claim 1, line 8, (column 26, line 65),
delete "$[\eta]/[\eta]1$", insert --$[\eta]/[\eta]_\ell$--.

line 9, (column 26, line 66),
delete "$[\eta]1$", insert --$[\eta]_\ell$--.

line 19, (column 27, line 8),
delete "[100° C.]".

line 31, (column 27, line 22),
after "$H_7$", insert --)--.

line 39, (column 27, line 32),
delete the second occurence of "of".

Claim 5, line 4, (column 27, line 55),
after "40", insert --, --.

line 8, (column 27, line 59),
delete "$[\eta]/[\eta]1$", insert --$[\eta]/[\eta]_\ell$--.

line 9, (column 27, line 60),
delete "$[\eta]1$", insert --$[\eta]_\ell$--.

line 11, (column 27, line 62),
delete "ethylen", insert --ethylene--.

Claim 6, line 4, (column 28, line 25),
after "40,", insert --(C)--.

line 5, (column 28, line 26),
delete "(C)".

line 9, (column 28, line 30),
delete "$[\eta]1$", insert --$[\eta]_\ell$--.

UNITED STATES PATENT AND TRADEMARK OFFICE
CERTIFICATE OF CORRECTION

PATENT NO. : 4,588,794

DATED : May 13, 1986

INVENTOR(S) : Hidekuni Oda, et al

It is certified that error appears in the above-identified patent and that said Letters Patent is hereby corrected as shown below:

Claim 6, line 23, column 28, line 44, delete "compound".

Signed and Sealed this

Twelfth Day of August 1986

[SEAL]

Attest:

Attesting Officer

DONALD J. QUIGG

Commissioner of Patents and Trademarks